May 18, 1926.
F. MACY
1,584,879
SERVING SET
Filed June 24, 1924     3 Sheets-Sheet 1
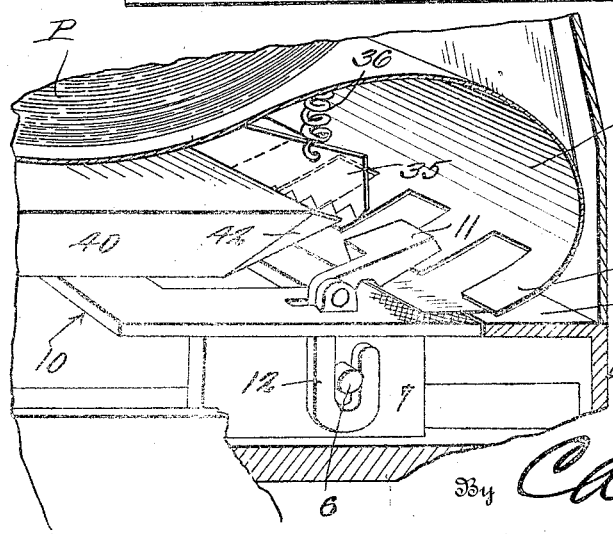

May 18, 1926.

F. MACY

SERVING SET

Filed June 24, 1924 3 Sheets-Sheet 2

1,584,879

F. Macy, Inventor,

By C. A. Snow & Co.

Attorneys.

May 18, 1926.

F. MACY

SERVING SET

Filed June 24, 1924   3 Sheets-Sheet 3

1,584,879

Inventor
F. Macy
By C.A. Snow & Co.
Attorneys

Patented May 18, 1926.

1,584,879

UNITED STATES PATENT OFFICE.

FRANK MACY, OF CONVERSE, INDIANA.

SERVING SET.

Application filed June 24, 1924. Serial No. 722,167.

This invention relates to what may be termed as serving sets for ice cream, fruit, food and the like and the object thereof is to provide a cheap, quick and serviceable lining of water proof paper for serving dishes which after having been once used is discarded.

Another object is to provide an apparatus for applying such lining to the serving set.

Another object is to provide an improved serving set for use in connection with the apparatus.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents an end elevation partly in section of the apparatus constituting a part of this invention with a serving dish in position ready to receive the lining;

Fig. 2 is a detail perspective view partly in section showing a portion of the apparatus;

Figure 3:
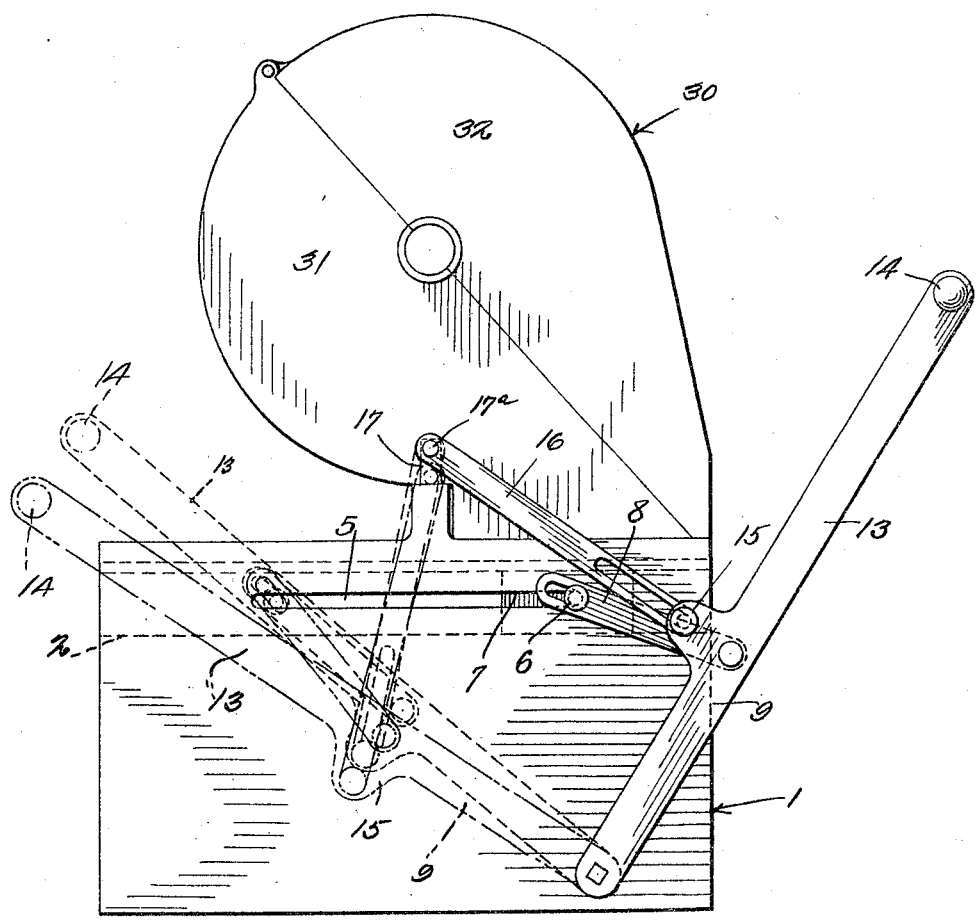
Fig. 3 is an end elevation taken from the opposite end from which Fig. 1 was taken, various positions of the mechanism being shown in dotted lines.
Figure 4:
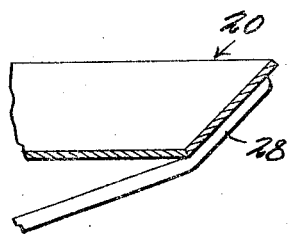
Fig. 4 is a detail sectional view through one portion of the serving dish.

In the embodiment illustrated a hollow supporting base 1 is shown having longitudinally extending guides 2 formed on its inner face at the opposite sides thereof and extending longitudinally of the base. The inner walls 3 of these guides have their upper edges beveled downwardly and inwardly as shown at 4 to form seats for the serving dish 20 to be lined and which is accomplished in a manner presently to be described.

The outer walls of these guides are slotted longitudinally as shown at 5 and are designed to receive studs or stub shafts 6 carried by sliding blocks 7 mounted to travel in the guides 2.

Mounted on the hollow base 1 is a housing 30 designed to support the roll of paper C which supplies the paper for lining the serving dish 20. This housing 30 is composed of two hingedly connected sections 31 and 32 to facilitate the insertion and removal of the paper roll P. A paper tensioning element 33 is carried by the housing 30 as shown in Figs. 1 and 2 and is provided with spring fingers 34 which bear on the paper as shown in Fig. 2 forcing it down against a shelf 34ª and exerts tension to prevent the too rapid unwinding thereof when being drawn over the serving dish 20 in a manner presently to be described.

A paper carriage 10 is mounted to travel on top of the hollow base 1 between a forming block 40 and the serving dish 20 to be lined which latter is supported on the beveled face 4 of the walls 3 of guides 2.

The carriage 10 is equipped with gripping fingers 11 preferably provided with serrated gripping faces which are designed to clamp the paper P between them and the carriage so that when the carriage is moved forwardly it will carry with it the paper P for lining the serving dish.

Formed integral with the fingers 11 and depending from the carriage 10 are hooks 12 designed to be engaged with the stub shafts 6 which project outwardly from the sliding blocks 7. These stub shafts 6 are also engaged by propelling links 8 carried by levers 9 and 9ª, said levers being exactly alike and disposed on opposite sides of the hollow base 1, the only difference being that the lever 9 has an extension 13 equipped with a hand grip 14 for actuating the mechanism in a manner presently to be described.

Thus it will be seen that as the stub shafts 6 move forwardly, the members 7 and hook members 12 also are moved forwardly tilting the grippers 11 into engagement with the paper positioned directly thereunder.

These levers 9 and 9ª have laterally extending lugs 15 with which are pivotally connected longitudinally slotted links 16, the slots therein being engaged with the pivots which connect them with the lugs 15. The other ends of these links 16 are pivotally connected with spring pressed plungers 17 connected by a cross bar 18 which extends transversely across the forming block 40 and by means of which said block is forced downwardly into the serving dish 20 supported by the seats 3 and between which the paper lining is fed by the carriage 10, the paper being cut off by a serrated knife 35, said knife being engaged by an extension 41 of the forming block and forced down against the tension of its springs 36, which normally hold it in raised position and return it to such position after it has been lowered.

The serving dish 20 which is designed to be lined by the machine above described comprises a food receiving body 21 here shown rectangular in configuration and having flared side walls or flanges 22 and removable end walls 22ª which are also flared. The corners of this dish have slots as shown at 23 and the slots extend longitudinally along the faces of the side members as shown at 24, to allow the rim or flanges 22 to spring out slightly at these points when the paper lining is to be crowded down into the slots by means of fins 42 carried by the corners of the forming blocks 40. These slots form pockets to receive the surplus paper of the upturned paper lining. These flanges or rims 22 are made of thin spring steel and by permitting them to spring outwardly will prevent rupture of the lining which might otherwise occur.

Figure 6:
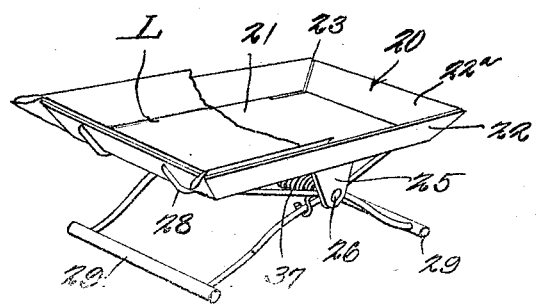
Fig. 6 is a perspective view of the serving dish with a lining mounted therein and partially broken out.
Figure 7:
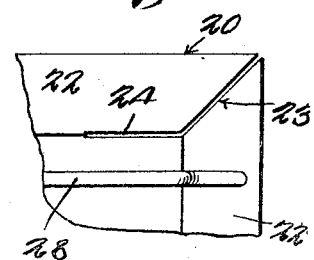
Fig. 7 is a detail bottom plan view of one corner of the serving dish illustrating the means for receiving and holding the lining for the dish.

Apertured ears 25 depend from opposite sides of the dish 20 and are designed to support a rod 26 which extends transversely across the bottom of said dish and has mounted thereon a coiled spring 37 designed to engage the rods 28 which carry the ends 22ª of the dish 20, said ends being movable toward and away from the body of the dish by means of hand grips 29 by moving said hand grips 29 toward each other against the tension of the spring 27 which movement releases the lining shown at L in Fig. 6 and permits it to be thrown out of the dish after having been used.

Figure 5:
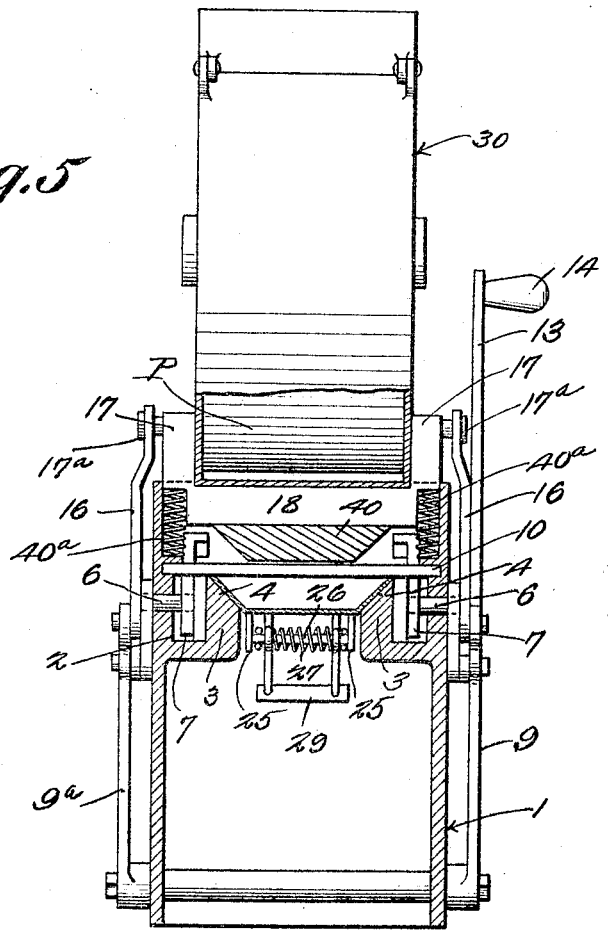
Fig. 5 is a transverse vertical section with parts in elevation.

In the use of this apparatus the serving dish 20 is mounted in the base member 1 as shown in Figs. 1 and 5, the diverging flanges thereof resting on the beveled faces 4 of the walls 3 of the guides 2. The paper P being extended under the spring gripping fingers 34 between the gripping elements 11 and the carriage top the device is ready for operation. The operator then grasps the handle 14 and moves the lever 9 forward and this lever through its connection with lever 9ª causes the carriage 10 to travel forward carrying with it the sheet of paper which is designed for lining the dish 20, and which is gripped between the elements 11 and the carriage. The pull of the lever is continued until the carriage has completed its forward stroke and when in this position the propelling links 8 will be in a straight line with the levers 9 and 9ª as is shown clearly in dotted lines in Fig. 3. A continuous pull on the lever causes the link 16 to pull down the forming block 40 against the tension of the springs 40ª which causes a reverse in travel of the links 8 and thus releases the grip 11 from the paper permitting it to be pushed down into the dish by the forming block. The reversing of the lever pulls the carriage 10 back with the grips 11 held open and the carriage travels up to and against the tension of plate 34ª, the corners of which are cut away so that the paper will lie between the top of the carriage and the grips 11 to be clamped thereby. As the forming block is lowered the projection 41 thereof engages the knife 35 and causes it to simultaneously sever the paper the proper length for lining the dish. The lowering of the forming block into the dish causes the paper lining to conform to the shape of the dish while the thin metal fins 42 on each corner of the block pushes the surplus paper out through the slots 23 in the corners of the dish and which is held by flanges 22 and 22ª the spring 27 operating to hold these flanges securely engaged with the paper forced through the slots.

The lining is thus held while block 40 is raised and the fins withdrawn.

When it is desired to release the lining from the dish 20 the hand grips 29 are grasped and forced toward each other against the tension of spring 27.

The paper P used for this purpose is formed in tight rolls and inclosed in the housing 30 and protected against atmospheric conditions. It is never touched by the hand or any serving implement thus ensuring its being retained in sanitary condition.

I claim:—

1. In a device of the character described, a supporting structure including a base, a paper roll housing mounted above the base, a spring retracted former operating above the base, a carriage mounted to reciprocate beneath the former, paper gripping members on the carriage and adapted to grip paper and deliver the same beneath said former, said base adapted to support a tray, means for moving the former to force the paper into the tray, a cutter for cutting the paper, and means for operating the carriage, former and cutter.

2. In a device of the character described, a supporting structure, including a base adapted to support a tray, a paper roll supporting housing mounted above the supporting structure, a spring retracted former operating above the base, a carriage adapted to move across the upper portion of the supporting structure and under the former, gripping members adapted to grip the paper and carry it above the base, said gripping members adapted to move with the carriage, and means for actuating the former and carriage simultaneously.

3. In a device of the character described, a supporting structure, a paper roll housing mounted thereon, a base forming a part of the supporting structure, said base adapted to support a tray, means for moving a length of paper over a tray supported on the base, means for pressing the paper into the tray, and means for operating the former and paper moving means.

4. In a device of the character described, a supporting structure, a base forming a part of the supporting structure, said base adapted to support a tray having slots in its corners, a former having fins at its corners, means for gripping a length of paper and drawing it over the tray, said former adapted to force the paper into the tray, said fins adapted to force the paper into the slots of the tray, and means for operating the former.

5. In a device of the class described, a supporting structure including a base, said base adapted to support a tray, a former movable above the base, means for gripping paper and drawing it across the upper portion of the tray supported in the base, a former operating above the tray and adapted to force the paper into the tray, a cutting member for cutting the paper, and means for operating the former.

In testimony that I claim the foregoing as my own, I have hereto affixed my signature.

FRANK MACY.